No. 806,021. PATENTED NOV. 28, 1905.
R. SYMMONDS.
DIFFERENTIAL GEARING.
APPLICATION FILED MAR. 2, 1903.
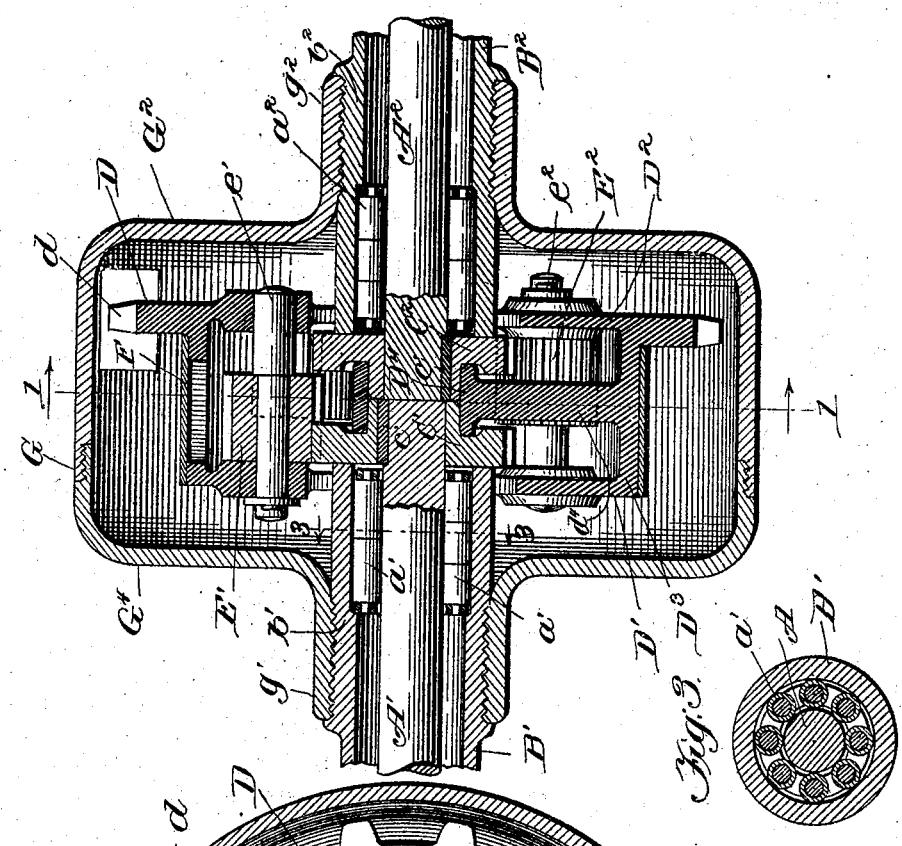
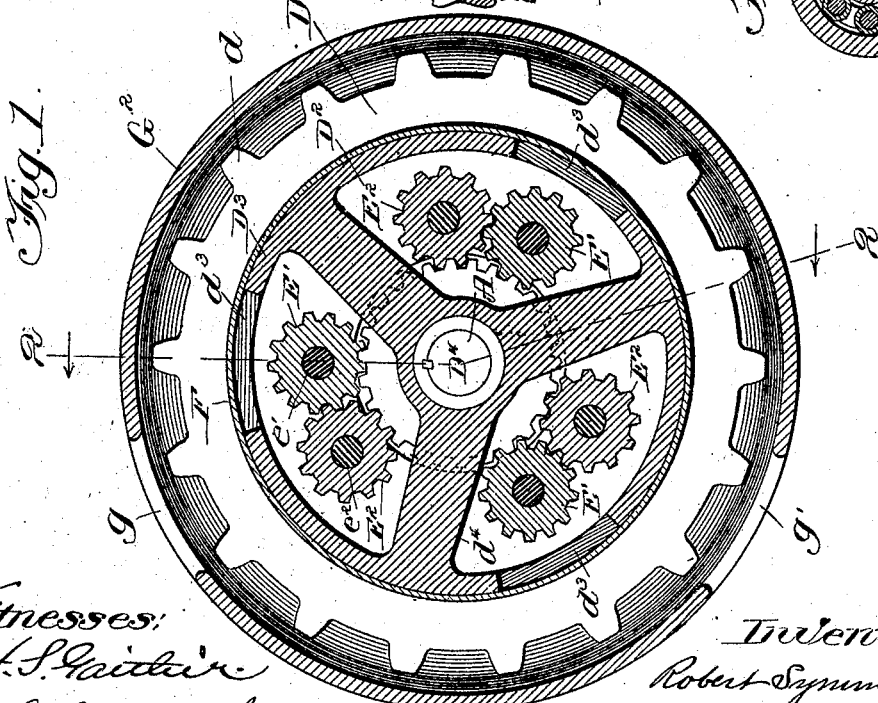
Witnesses:
H. S. Gaither.
C. C. Cunningham.
Inventor:
Robert Symmonds
by Chamberlin & Wilkinson
Attorneys.

UNITED STATES PATENT OFFICE.

ROBERT SYMMONDS, OF KENOSHA, WISCONSIN, ASSIGNOR TO THOMAS B. JEFFERY, OF KENOSHA, WISCONSIN.

DIFFERENTIAL GEARING.

No. 806,021.     Specification of Letters Patent.     Patented Nov. 28, 1905.

Application filed March 2, 1903. Serial No. 145,707.

*To all whom it may concern:*

Be it known that I, ROBERT SYMMONDS, a citizen of the United States, residing at Kenosha, county of Kenosha, State of Wisconsin, have invented a certain new and useful Improvement in Differential Gearing; and I declare the following to be a full, clear, and exact description of the invention, such as will enable others skilled in the art to which it pertains to make and use the same, reference being had to the accompanying drawings, which form a part of this specification.

My invention relates generally to differential compensating gearing, and more particularly to gearing for connecting a power-transmitting mechanism with two separate alined shafts.

It is frequently desirable to so connect a power-transmitting mechanism to two separate shafts that the shafts will be normally driven in the same direction at the same speed, but may rotate at different relative speeds—as, for instance, where the two shafts are alined parts of the rear axle of an automobile, which are normally rotated in the same direction and at the same speed, but which, by being capable of rotating at different relative speeds, facilitate the turning of corners by the automobile.

The primary object of my invention is to provide a differential or compensating gearing consisting, essentially, in a driving-wheel for receiving rotary motion from the motor, walls between which are journaled pairs of meshed pinions, and a bearing surrounding the hubs of the gears which engage corresponding pinions in each pair and which are keyed upon the ends of the alined shafts, the driving-wheel, walls, and bearing consisting in an integral member rotatively supported concentrically upon the adjacent ends of the alined shafts.

A further object of my invention is to provide a gearing of the character referred to which will be simple in construction, inexpensive in manufacture, and efficient in operation.

My invention will be more fully described hereinafter with reference to the accompanying drawings, in which the same is illustrated as embodied in a convenient and practical form, and in which—

Figure 1 is a central section taken on line 1 1, Fig. 2; Fig. 2, a transverse central section on line 2 2, Fig. 1; and Fig. 3 is a sectional view on line 3 3, Fig. 2.

Similar reference characters are used to designate similar parts in the several figures of the drawings.

Reference-letters $A'$ and $A^2$ indicate alined shafts, which may consist in the two portions of the rear axle of an automobile, to the outer ends of which are secured the rear wheels. The shafts $A'$ and $A^2$ are surrounded by tubes $B'$ and $B^2$, which are secured to any suitable support—such, for instance, as the rear springs of an automobile. The roller-bearings $a'$ and $a^2$ surround the shafts $A'$ and $A^2$ and support the same concentrically within the surrounding tubes.

$b'$ and $b^2$ indicate shoulders formed upon the inner surfaces of the tubes to be engaged by the roller-bearings to retain the latter at the ends of the respective tubes.

Gear-wheels $C'$ and $C^2$ are fixed upon the adjacent ends of the shafts $A'$ and $A^2$, respectively, by any suitable locking device—such, for instance, as keys $c'$ and $c^2$. Surrounding the gear-wheels $C'$ and $C^2$ is a hollow integral power-transmitting member D. The member D comprises parallel circular side walls $D'$ and $D^2$, united by a ring $D^3$. A hub $D^4$ is located concentrically within the ring $D^3$ and is rigidly connected to the ring by interposed spokes $d^4$. The hub $D^4$ is of an interior diameter to closely surround the hubs on the gear-wheels $C'$ and $C^2$, and thereby constitutes means not only for retaining the shafts $A'$ and $A^2$ in alinement, but also means for supporting the power-transmission member D concentrically about the shafts, and consequently concentrically around the gear-wheels $C'$ and $C^2$. Means for driving the member D is provided in the form of a driving-wheel $d$, which is preferably formed integrally therewith, as clearly shown in Fig. 1. The driving-wheel is shown as a sprocket-wheel adapted to be engaged by a sprocket-chain leading from the motor or other source of power. Located between the walls $D'$ and $D^2$ of the member D are pairs of meshed pinions $E'$ and $E^2$. The pinions $E'$ in each pair are mounted upon spindles $e'$, supported in bearings formed in the walls $D'$ and $D^2$. A shoulder is formed upon each of the spindles $e'$, which retains the corresponding pinion $E'$ against the interior surface of the wall $D'$. Similar spindles $e^2$ are mounted in bearings formed in the walls $D'$ and $D^2$, upon which are supported the pinions $E^2$ of the several pairs. The pinions $E'$ mesh with the gear-wheel $C'$, but terminate a distance away from the wall $D^2$ slightly greater than the width of the gear-wheel $C^2$, and therefore are not engaged by the latter. The pinions $E^2$ are in mesh with the gear-wheel $C^2$, but terminate such a distance from the wall $D'$ as to avoid engagement with the gear-wheel $C'$. The pinions in each pair overlap each other a distance corresponding approximately to the space between the gear-wheels $C'$ and $C^2$, as clearly shown in Fig. 2.

In order that the pinions may be located between the walls of the hollow member D, openings $d^3$ are formed through the ring $D^3$ between the spokes $d^4$. It is evident that the pinions may be inserted through the openings $d^3$ and the spindles then passed through the walls and the pinions, so as to assemble the pinions in meshed pairs between the walls of the member D. A strap F is preferably located around the exterior of the ring $D^3$ to close the openings $d^3$ therethrough.

The member D is preferably inclosed in a casing composed of two parts $G'$ and $G^2$, united in any suitable manner—such, for instance, as by screw-threaded flanges, (shown in G.) The two parts of the casing are provided with hubs $g'$ and $g^2$, respectively, which are in screw-threaded engagement with correspondingly-screw-threaded portions $b'$ and $b^2$ on the tubes $B'$ and $B^2$. Openings $g$ $g$ are provided in the casing, through which passes a sprocket-chain which engages the teeth $d$ of the driving-wheel.

The operation of my invention is as follows: The rotary motion imparted to the driving-wheel is communicated, by means of the power-transmission member D and the interlocked pinions and gear-wheels, to the two alined shafts. It is evident that the meshed pinions in each pair serve to lock the shafts to the power-transmission member when the resistance to the rotation of the two shafts is equal. When, however, the resistance to the rotation of one shaft is greater than that to the rotation of the other shaft, the latter shaft is permitted to rotate at a relatively greater speed by reason of the meshed pinions in each pair rotating in opposite directions at a speed corresponding to the difference in the speeds of rotation of the two shafts. When the two shafts are the alined portions of the rear axle of an automobile, the resistance to the rotation of the outer wheel in turning a corner is less than that imposed upon the inner wheel. Consequently the outer portion of the axle has a tendency to rotate faster than the inner portion of the axle, which is permitted by the improved gearing herein described.

From the foregoing description it will be observed that I have invented an improved differential gearing consisting, essentially, in an integral power-transmission member comprising the driving-wheel, the bearings for parts of meshed pinions, and a bearing for retaining the two shafts in alinement and for concentrically supporting the power-transmission member around the same.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having thus fully described my invention, what I claim as new, and desire to secure by Letters Patent, is—

1. In a differential gearing, the combination with a hollow power-transmission member, of a pair of meshed pinions, bearings formed integrally with said member in which said pinions are journaled, a pair of gears meshing with the respective pinions in said pair, alined shafts upon which said pair of gears are respectively fixed, a bearing also formed integrally with said member and surrounding the adjacent ends of said alined shafts between said gears, tubular supports surrounding said shafts, and roller-bearings interposed between the portions of said shafts adjacent said gears and the surrounding tubular supports.

2. In a differential gearing, the combination with a hollow power-transmission member, of a pair of meshed pinions, bearings formed integrally with said member in which said pinions are journaled, a pair of gears meshing with the respective pinions in said pair, alined shafts the adjacent ends of which are surrounded by the hubs of said pair of gears, a bearing also formed integrally with said member and surrounding the adjacent hubs on said gears thereby supporting said member concentrically with respect to said shafts and retaining said shafts in alinement, hollow supports surrounding said shafts, and a two-part casing inclosing the transmission member and having hubs secured to said hollow supports.

3. In a differential gearing, an integral hollow power-transmission member comprising a ring, circular parallel side walls united to said ring between which pairs of meshed pinions are adapted to be journaled, a circular bearing, and spokes interposed between and concentrically uniting said bearing and said ring.

4. In a differential gearing, an integral hollow power-transmission member comprising a ring and parallel side walls between which pairs of meshed pinions are adapted to be journaled, a circular bearing, connecting means interposed between said bearing and said ring for retaining the same concentrically, and a driving-wheel projecting radially around one of said side walls.

5. In a differential gearing, the combination with two alined shafts, of two gears located side by side and fixed respectively to the adjacent ends of said shafts, hubs projecting into contact with each other formed on said gears, a circular bearing interposed between said gears and closely surrounding said hubs, a hollow power-transmitting member formed integrally with said circular bearing having opposite side walls integral therewith, and a pair of pinions interposed between said circular bearing and the outer wall of said hollow power-transmitting member and journaled in bearings formed in said side walls, said pinions meshing with each other and respectively engaging said gears bearings in which said shafts are supported located adjacent said gears, and a two-part casing inclosing the gearing and having hubs secured to said bearings.

6. In a differential gearing, the combination with two alined shafts, of two gears fixed respectively on the adjacent ends of said shafts, a hollow power-transmitting member, a circular bearing surrounding the adjacent ends of said shafts and retaining the same in alinement, means for rigidly supporting said bearing concentrically within said hollow power-transmitting member, a pair of meshed pinions journaled in bearings supported by and formed integral with said member and meshing respectively with the gears secured to the ends of the alined shafts and bearings in which said shafts are journaled located adjacent said gears, and means connecting said bearings and thereby preventing the adjacent ends of said shafts from separating.

7. In a differential gearing, the combination with two alined shafts, of two gears located side by side and fixed respectively to the adjacent ends of said shafts, hubs formed on the respective gears and projecting into contact with each other, a hollow power-transmission member, a circular bearing interposed between said gears and closely surrounding the hubs thereon, means for rigidly supporting said bearing concentrically within said hollow power-transmitting member, a pair of pinions inclosed within said hollow member and journaled in bearings formed in the integral side walls thereof, said pinions meshing with each other and each engaging one of said gears and bearings in which said shafts are journaled located adjacent said gears, and means connecting said bearings and thereby preventing the adjacent ends of said shafts from separating.

8. In a differential gearing, the combination with two alined shafts, of a pair of gears located side by side and fixed respectively to the adjacent ends of said shafts, a hollow power-transmitting member within which said gears are located comprising parallel side walls united by an interposed ring, said side walls having openings around the respective shafts slightly greater in diameter than the diameter of said gears, a circular bearing interposed between said gears and surrounding the ends of said alined shafts, means rigidly supporting said bearing concentrically within the ring of said hollow power-transmitting member, pairs of meshed pinions journaled in bearings in said side walls, said pinions respectively engaging said gears, the ring of said hollow power-transmitting member having openings through which said pinions are inserted.

In testimony whereof I sign this specification in the presence of two witnesses.

ROBERT SYMMONDS.

Witnesses:
H. W. JEFFERY,
T. W. JOHNSTON.